US006865149B1

(12) United States Patent
Kalman et al.

(10) Patent No.: US 6,865,149 B1
(45) Date of Patent: Mar. 8, 2005

(54) DYNAMICALLY ALLOCATED RING PROTECTION AND RESTORATION TECHNIQUE

(75) Inventors: Robert F. Kalman, Cupertino, CA (US); Jason C. Fan, Mountain View, CA (US); Charles F. Barry, Campbell, CA (US); Prasad P. Jogalekar, Sunnyvale, CA (US); Vinay K. Bannai, Mountain View, CA (US)

(73) Assignee: Luminous Networks, Inc., Cupertino, CA (US)

( * ) Notice: Subject to any disclaimer, the term of this patent is extended or adjusted under 35 U.S.C. 154(b) by 0 days.

(21) Appl. No.: 09/519,442

(22) Filed: Mar. 3, 2000

(51) Int. Cl.$^7$ .............................................. G01R 31/08
(52) U.S. Cl. ...................................... 370/225; 370/242
(58) Field of Search ................................ 370/221, 222, 370/223, 224, 225, 227, 242, 245

(56) References Cited

U.S. PATENT DOCUMENTS

| | | | | |
|---|---|---|---|---|
| 4,663,748 A | * | 5/1987 | Karbowiak et al. | 370/224 |
| 4,698,804 A | * | 10/1987 | Flores et al. | 370/421 |
| 5,311,585 A | * | 5/1994 | Armstrong et al. | 379/221.02 |
| 5,333,130 A | | 7/1994 | Weissmann et al. | 370/16 |
| 5,398,236 A | | 3/1995 | Hemmady et al. | 370/16 |
| 5,636,205 A | * | 6/1997 | Suzuki et al. | 370/224 |
| 5,721,819 A | | 2/1998 | Galles et al. | 395/200.15 |
| 5,790,523 A | | 8/1998 | Ritchie et al. | 370/241 |
| 5,793,745 A | * | 8/1998 | Manchester | 370/224 |
| 6,011,780 A | | 1/2000 | Vaman et al. | 370/237 |
| 6,047,331 A | | 4/2000 | Medard et al. | 709/239 |
| 6,094,582 A | | 7/2000 | Zimmermann | 455/452 |
| 6,122,759 A | | 9/2000 | Ayanoglu et al. | 714/57 |
| 6,226,296 B1 | | 5/2001 | Lindsey et al. | 370/401 |
| 6,229,788 B1 | | 5/2001 | Graves et al. | 370/230 |
| 6,236,640 B1 | * | 5/2001 | Klink | 370/224 |
| 6,269,452 B1 | * | 7/2001 | Daruwalla et al. | 370/222 |
| 6,292,464 B1 | | 9/2001 | Elahmadi et al. | 370/223 |
| 6,304,347 B1 | | 10/2001 | Beine et al. | 359/110 |
| 6,305,019 B1 | | 10/2001 | Dyer et al. | 725/91 |

(List continued on next page.)

OTHER PUBLICATIONS

MMC Networks, "EPIF 4–L3 Reference Manual," MMC 97–0030, Issue 1.0, pp. i–viii, 1–1—1–6,2–1—2–16, and 3–1 3—13–16, Oct. 1998.

(List continued on next page.)

*Primary Examiner*—Chi Pham
*Assistant Examiner*—Keith M. George
(74) *Attorney, Agent, or Firm*—Sawyer Law Group LLP

(57) ABSTRACT

The disclosed network includes two rings, wherein a first ring transmits data in a clockwise direction, and the other ring transmits data in a counterclockwise direction. The traffic is removed from the ring by the destination node. During normal operations (i.e., all spans operational), data between nodes flows on the ring that would provide the minimum number of hops to the destination node. Thus, both rings are fully utilized during normal operations. The nodes periodically test the bit error rate of the links (or the error rate is constantly calculated) to detect a fault in one of the links. The detection of such a fault sends a broadcast signal to all nodes to reconfigure a routing table within the node so as to identify the optimum routing of source traffic to the destination node after the fault. Since the available links will now see more data traffic due to the failed link, traffic designated as "unprotected" traffic is given lower priority and may be dropped or delayed in favor of the "protected" traffic. Specific techniques are described for identifying a failed link, communicating the failed link to the other nodes, differentiating between protected and unprotected classes of traffic, and updating the routing tables.

11 Claims, 6 Drawing Sheets

U.S. PATENT DOCUMENTS

| | | |
|---|---|---|
| 6,343,081 B1 | 1/2002 | Blanc et al. ................ 370/411 |
| 6,400,681 B1 | 6/2002 | Bertin et al. ................ 370/218 |
| 6,426,947 B1 | 7/2002 | Banker et al. .............. 370/254 |
| 6,557,112 B1 * | 4/2003 | Shimada ..................... 370/222 |

OTHER PUBLICATIONS

MMC Networks, "Any Flow 5400 Product Overview", 3 pages.

MMC Networks, EPIF4–L3C1 Ethernet Port L3 Processor, MMC Networks, Inc., MMC 98–0066, Issue 1.0, pp. 1–37, 1998.

MMC Networks, XPIF–300A3/XPIF–300A3–50 Gigabit BirStream Processor, MMC 99–0046, Issue 0.91 pp. 1–64, 1999.

* cited by examiner

DYNAMICALLY ALLOCATED RING PROTECTION AND RESTORATION TECHNIQUE

FIELD OF THE INVENTION

This invention relates to communication networks and, in particular, to networks employing rings.

BACKGROUND

As data services become increasingly mission-critical to businesses, service disruptions become increasingly costly. A type of service disruption that is of great concern is span outage, which may be due either to facility or equipment failures. Carriers of voice traffic have traditionally designed their networks to be robust in the case of facility outages, e.g. fiber breaks. As stated in the Telcordia GR-253 and GR-499 specifications for optical ring networks in the telecommunications infrastructure, voice or other protected services must not be disrupted for more than 60 milliseconds by a single facility outage. This includes up to 10 milliseconds for detection of a facility outage, and up to 50 milliseconds for rerouting of traffic.

A significant technology for implementing survivable networks meeting the above requirements has been SONET rings. A fundamental characteristic of such rings is that there are one (or more) independent physical links connecting adjacent nodes in the ring. Each link may be unidirectional, e.g. allow traffic to pass in a single direction, or may be bidirectional. A node is defined as a point where traffic can enter or exit the ring. A single span connects two adjacent nodes, where a span consists of all links directly connecting the nodes. A span is typically implemented as either a two fiber or four fiber connection between the two nodes. In the two fiber case, each link is bidirectional, with half the traffic in each fiber going in the "clockwise" direction (or direction 0), and the other half going in the "counterclockwise" direction (or direction 1 opposite to direction 0). In the four fiber case, each link is unidirectional, with two fibers carrying traffic in direction 0 and two fibers carrying traffic in direction 1. This enables a communication path between any pair of nodes to be maintained on a single direction around the ring when the physical span between any single pair of nodes is lost. In the remainder of this document, references will be made only to direction 0 and direction 1 for generality.

There are 2 major types of SONET rings: unidirectional path-switched rings (UPSR) and bi-directional line-switched rings (BLSR). In the case of UPSR, robust ring operation is achieved by sending data in both directions around the ring for all inter-node traffic on the ring. This is shown in FIG. 1. This figure shows an N-node ring made up of nodes (networking devices) numbered from node 0 to node N−1 and interconnected by spans. In this document, nodes are numbered in ascending order in direction 0 starting from 0 for notational convenience. A link passing traffic from node i to node j is denoted by dij. A span is denoted by sij, which is equivalent to sji. In this document, the term span will be used for general discussion. The term link will be used only when necessary for precision. In this diagram, traffic from node 0 to node 5 is shown taking physical routes (bold arrows) in both direction 0 and direction 1. (In this document, nodes will be numbered sequentially in an increasing fashion in direction 0 for convenience. Node 0 will be used for examples.) At the receiving end, a special receiver implements "tail-end switching," in which the receiver selects the data from one of the directions around the ring. The receiver can make this choice based on various performance monitoring (PM) mechanisms supported by SONET. This protection mechanism has the advantage that it is very simple, because no ring-level messaging is required to communicate a span break to the nodes on the ring. Rather, the PM facilities built into SONET ensure that a "bad" span does not impact physical connectivity between nodes, since no data whatsoever is lost due to a single span failure.

Unfortunately, there is a high price to be paid for this protection. Depending on the traffic pattern on the ring, UPSR requires 100% extra capacity (for a single "hubbed" pattern) to 300% extra capacity (for a uniform "meshed" pattern) to as much as (N−1)*100% extra capacity (for an N node ring with a nearest neighbor pattern, such as that shown in FIG. 1) to be set aside for protection.

In the case of two-fiber BLSR, shown in FIG. 2A, data from any given node to another typically travels in one direction (solid arrows) around the ring. Data communication is shown between nodes 0 and 5. Half the capacity of each ring is reserved to protect against span failures on the other ring. The dashed arrows illustrate a ring that is typically not used for traffic between nodes 0 and 5 except in the case of a span failure or in the case of unusual traffic congestion.

In FIG. 2B, the span between nodes 6 and 7 has experienced a fault. Protection switching is now provided by reversing the direction of the signal from node 0 when it encounters the failed span and using excess ring capacity to route the signal to node 5. This switching, which takes place at the same nodes that detect the fault, is very rapid and is designed to meet the 50 millisecond requirement.

BLSR protection requires 100% extra capacity over that which would be required for an unprotected ring, since the equivalent of the bandwidth of one full ring is not used except in the event of a span failure. Unlike UPSR, BLSR requires ring-level signaling between nodes to communicate information on span cuts and proper coordination of nodes to initiate ring protection.

Though these SONET ring protection technologies have proven themselves to be robust, they are extremely wasteful of capacity. Additionally, both UPSR and BLSR depend intimately on the capabilities provided by SONET for their operation, and therefore cannot be readily mapped onto non-SONET transport mechanisms.

What is needed is a protection technology where no extra network capacity is consumed during "normal" operation (i.e., when all ring spans are operational), which is less tightly linked to a specific transport protocol, and which is designed to meet the Telcordia 50 millisecond switching requirement.

SUMMARY

A network protection and restoration technique is described that efficiently utilizes the total bandwidth in the network to overcome the drawbacks of the previously described networks, that is not linked to a specific transport protocol such as SONET, and that is designed to meet the Telcordia 50 millisecond switching requirement. The disclosed network includes two rings, wherein a first ring transmits data in a "clockwise" direction (or direction 0), and the other ring transmits data in a "counterclockwise" direction (or direction 1 opposite to direction 0). Additional rings may also be used. The traffic is removed from the ring by the destination node.

During normal operations (i.e., all spans operational and undegraded), data between nodes flows on the ring that provides the lowest-cost path to the destination node. If traffic usage is uniformly distributed throughout the network, the lowest-cost path is typically the minimum number of hops to the destination node. Thus, both rings are fully utilized during normal operations. Each node determines the lowest-cost path from it to every other node on the ring. To do this, each node must know the network topology.

A node monitors the status of each link for which it is at the receiving end, e.g. each of its ingress links, to detect a fault. The detection of such a fault causes a highest-priority link status broadcast message to be sent to all nodes. Processing at each node of the information contained in the link status broadcast message results in reconfiguration of a routing table within each node so as to identify the optimum routing of source traffic to the destination node after the fault. Hence, all nodes know the status of the network and all independently identify the optimal routing path to each destination node when there is a fault in any of the links. The processing is designed to be extremely efficient to maximize switching speed.

Optionally, if it is desired to further increase the switching speed, an interim step can be used. A node that detects a link fault notifies its neighbor on the other side of that span that a link has failed. Any node that detects an ingress link failure or that receives such a notification wraps inbound traffic headed for that span around onto the other ring. Traffic will be wrapped around only temporarily until the previously described rerouting of traffic is completed.

Since the remaining links will now see more data traffic due to the failed link, traffic designated as "unprotected" traffic is given lower priority and may be dropped or delayed in favor of the "protected" traffic. Specific techniques are described for identifying a failed link, communicating the failed link to the other nodes, differentiating between protected and unprotected classes of traffic, and updating the routing tables. Although the embodiments described transmit packets of data, the invention may be applied to any network transmitting frames, cells, or using any other protocol. Frames and cells are similar to packets in that all contain data and control information pertaining at least to the source and destination for the data. A single frame may contain multiple packets, depending on the protocol. A cell may be fixed-size, depending on the protocol.

DETAILED DESCRIPTION OF THE EMBODIMENTS

The purpose of the invention described herein is to achieve fast protection in a ring network while providing for efficient network capacity utilization. Certain aspects of the preferred embodiment are:

a. Transmission of a given packet between two nodes in only one direction around the ring (rather than in both directions as is done in SONET UPSR).

b. Differentiation between "protected" and "unprotected" traffic classes.

c. A fast topology communication mechanism to rapidly communicate information about a span break to all nodes in the ring.

d. A fast re-routing/routing table update mechanism to re-route paths impacted by a span break the other direction around the ring.

e. An optional interim wrapping mechanism that may be used to further increase protection switching speed.

These aspects are described in more detail below.

Unidirectional Transmission

Figure 1:
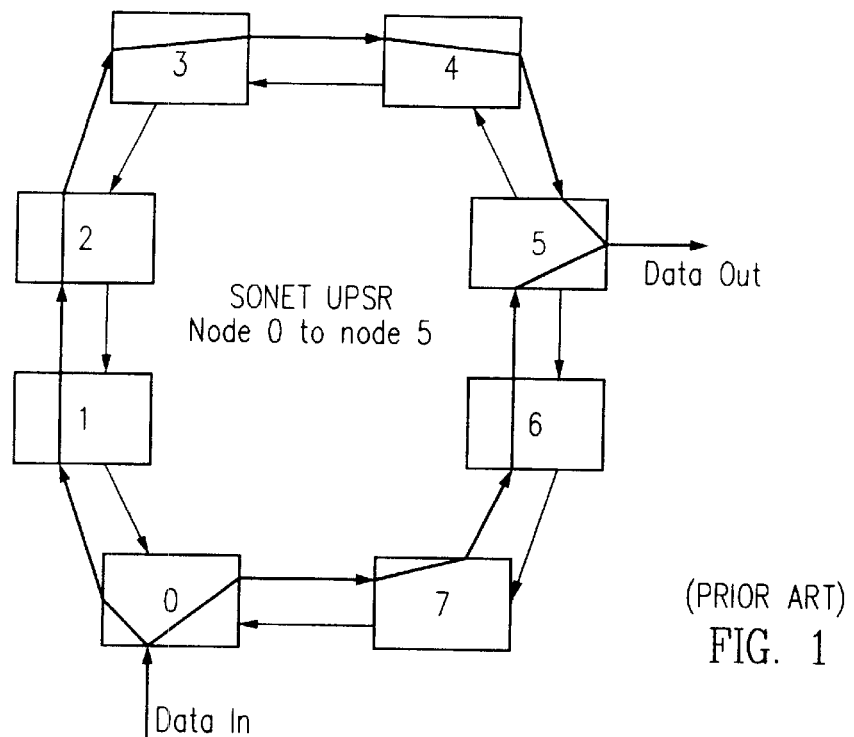
FIG. 1 illustrates inter-node physical routes taken by traffic from node 0 to node 5 using SONET UPSR, where a failure of spans between any single pair of nodes brings down only one of the two distinct physical routes for the traffic.
Figure 2A:
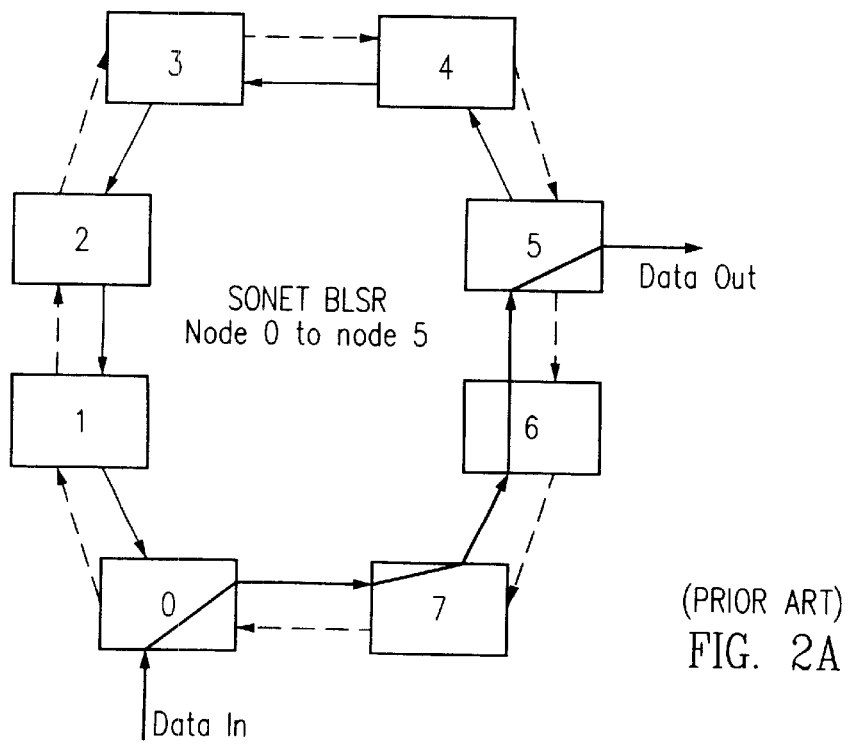
FIG. 2A illustrates an inter-node physical route taken by traffic from node 0 to node 5 using SONET two-fiber BLSR. Half of the capacity of each ring is reserved for protection, and half is used to carry regular traffic. The ring represented with dashed lines is the ring in which protection capacity is used to reroute traffic due to the span failure shown.
Figure 2B:
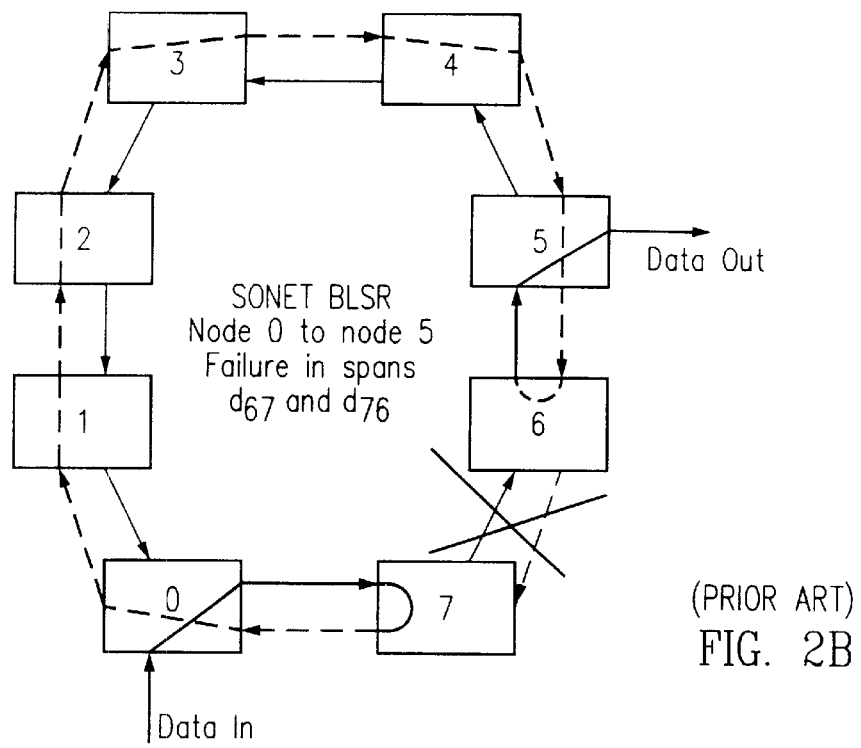
FIG. 2B illustrates the bidirectional path taken by traffic from node 0 to node 5 using the SONET BLSR structure of FIG. 2A when there is a failure in the link between nodes 6 and 7. Traffic is turned around when it encounters a failed link.
Figure 3:
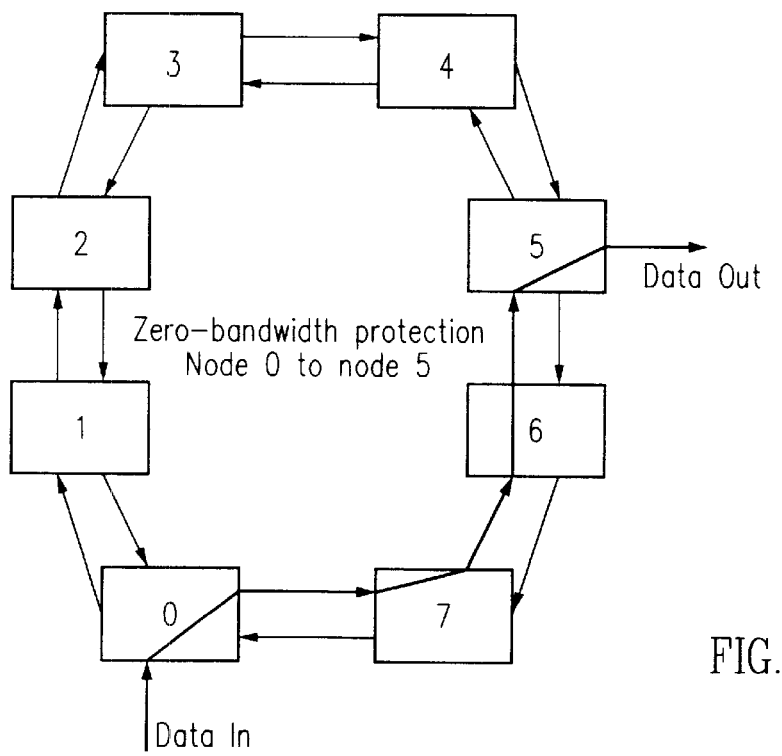
FIG. 3 illustrates a network in accordance with one embodiment of the present invention and, in particular, illustrates an inter-node physical route taken by traffic from node 0 to node 5.

A given packet/flow between two nodes is transmitted in only a single direction around the network (even when there is a span fault) and is removed from the ring by the destination node, as is shown in FIG. 3 where node 0 transmits information to node 5 in only the direction indicated by the thick arrows. A transmission from node 5 to node 0 would only go through nodes 6 and 7 in the opposite direction. This allows for optimized ring capacity utilization since no capacity is set aside for protection.

The least-cost physical route is typically used for protected traffic. This is often the shortest-hop physical route. For example, a transmission from node 0 to node 2 would typically be transmitted via node 1. The shortest-hop physical route corresponds to the least-cost route when traffic conditions throughout the network are relatively uniform. If traffic conditions are not uniform, the least-cost physical route from node 0 to node 2 can instead be the long path around the ring.

The removal of packets from the ring by the destination node ensures that traffic does not use more capacity than is necessary to deliver it to the destination node, thus enabling increased ring capacity through spatial reuse of capacity. An example of spatial reuse is the following. If 20% of span capacity is used up for traffic flowing from node 0 to node 2 via node 1, then the removal of this traffic from the ring at node 2 means that the 20% of span capacity is now available for any traffic flowing on any of the other spans in the ring (between nodes 2 and 3, nodes 3 and 4, etc.)

Protected and Unprotected Traffic Classes

Figure 4:
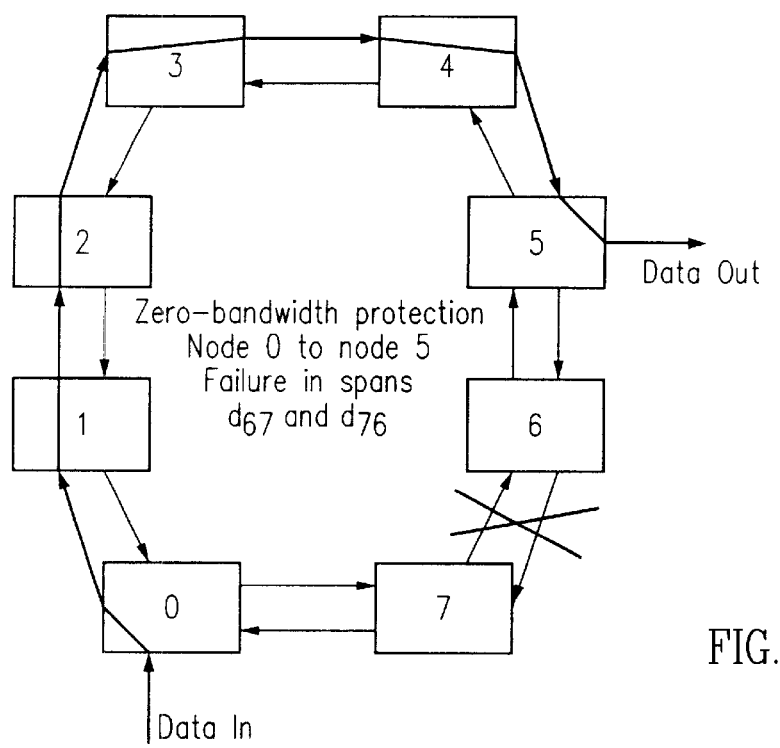
FIG. 4 illustrates the network of FIG. 3 after a failure has occurred on the span between nodes 6 and 7. When a failure occurs impacting a link or span on the initial path (e.g., between nodes 0 and 5), the traffic is rerouted at the ingress node to travel in the other direction around the ring to reach the destination node.

In the case of unidirectional transmission described above, the loss of any span in the ring will result in a reduction in network capacity. This follows from the fact that traffic that would flow along a given span during normal operations must share the capacity of other spans in the case of a failure of that span. For example, FIG. 4 shows a span break between nodes 6 and 7. In contrast to FIG. 3, a transmission from node 0 to node 5 must now travel in a clockwise direction on another ring (illustrated by the thick arrows), adding to the traffic on that ring.

Because some network capacity is lost in the case of a span outage, a heavily loaded network with no capacity set aside for protection must suffer some kind of performance degradation as a result of such an outage. If traffic is classified into a "protected" class and an "unprotected" class, network provisioning and control can be implemented such that protected traffic service is unaffected by the span outage. In such a case, all of the performance degradation is "absorbed" by the unprotected traffic class via a reduction in average, peak, and burst bandwidth allocated to unprotected traffic on remaining available spans so that there is sufficient network capacity to carry all protected traffic. Traffic within the unprotected class can be further differentiated into various subclasses such that certain subclasses suffer more degradation than do others. This degradation may consist of additional delay or dropping of this traffic. The mechanisms for traffic planning and management of protected and unprotected traffic are not covered in this specification.

Fast Topology Communication Mechanism

Due to Telcordia requirements previously mentioned, the loss of a span in a ring must be rapidly sensed and communicated to all nodes in a ring.

In the case of a span outage, the node on the receiving end of each link within the span detects that each individual link has failed. If only a single link is out, then only the loss of that link is reported. Depending on the performance monitoring (PM) features supported by the particular communications protocol stack being employed, this detection may be based on loss of optical (or electrical) signal, bit error rate (BER) degradation, loss of frame, or other indications.

Each link outage must then be communicated to the other nodes. This is most efficiently done through a broadcast (store-and-forward) message (packet), though it could also be done through a unicast message from the detecting node to each of the other nodes in the network. This message must at least be sent out on the direction opposite to that leading to the broken span. The message must contain information indicating which link has failed.

Fast Source Node Re-routing Mechanism

When a link outage message is received by a given node, the node must take measures to re-route traffic that normally passed through the link. A possible sequence of actions is:
  a. Receive link outage message;
  b. Evaluate all possible inter-node physical routes (there are 2*(N−1) of them in an N node ring) to determine which ones are impacted by the loss of the link;
  c. Update routing tables to force all impacted traffic to be routed the other way around the ring; and
  d. Update capacity allocated to unprotected traffic classes to account for reduced network capacity associated with the link outage. Details of how this capacity allocation is accomplished are not covered in this specification.

Being able to perform the operations above quickly requires that the various tables be properly organized to rapidly allow affected paths to be identified. Additionally, updates must be based either on computationally simple algorithms or on pre-calculated lookup tables.

Optional Interim Wrapping Mechanism

Figure 5:
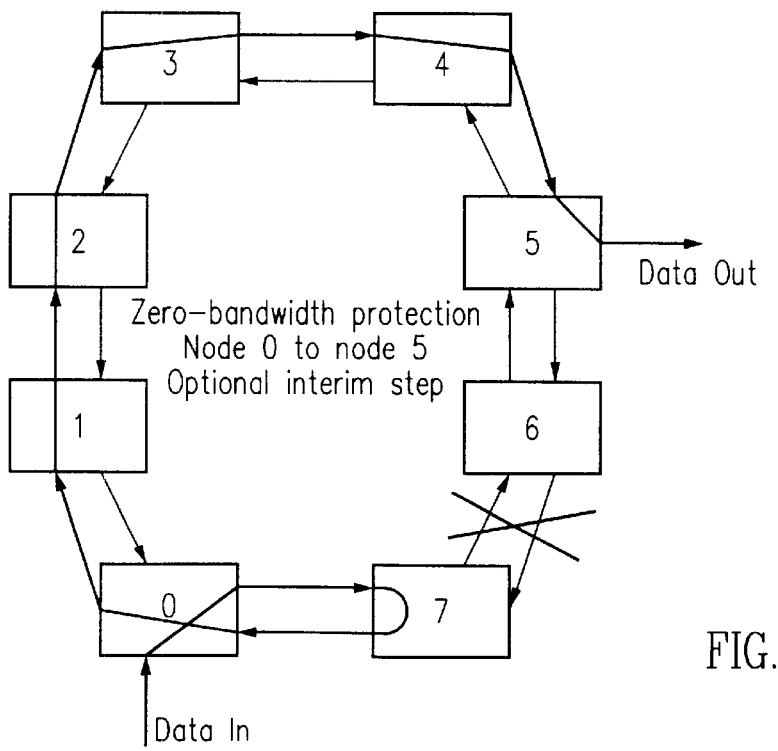
FIG. 5 illustrates the optional interim state of the network (based on wrapping traffic from one ring to the other) between that shown in FIG. 3 and that shown in FIG. 4.

To increase the speed of protection switching, it may be desirable to take direct action at the node(s) detecting the fault, rather than waiting for re-routing to take place at all nodes. A possible sequence of actions is:
  a. Upon detection of an ingress link fault, a node must transmit a neighbor fault notification message to the node on the other side of the faulty link. This notification is only required if there is a single link failure, as the node using the failed link as an egress link would not be able to detect that it had become faulty. In the event that a full span is broken, the failure to receive these notifications do not affect the following steps.
  b. Upon detection of an ingress link fault or upon receipt of a neighbor fault notification message, a node must wrap traffic bound for the corresponding egress link on that span onto the other ring. This is shown in FIG. 5. Traffic from node 0 bound for node 5 is wrapped by node 7 onto the opposite ring because the span connecting node 7 to node 6 is broken.

The above steps are optional and should only be used if increased protection switching speed using this approach is required. This is because wrapping traffic from one ring onto the other uses up significantly more ring capacity than the standard approach described in this document. During the period, albeit short, between the start of wrapping and the completion of rerouting at source nodes, the capacity that must be reserved for protection is as much as that required in two-fiber BLSR.

Specific Algorithms

Fast Topology Communication Mechanism

This section describes a specific fast mechanism for communicating topology changes to the nodes in a ring network. The mechanism for communicating information about a span or link break or degradation from a node to all other nodes on a ring is as follows.

A link status message is sent from each node detecting any link break or degradation on ingress links to the node, e.g. links for which the node is on the receiving end. (Therefore, for a single span break the two nodes on the ends of the span will each send out a link status message reporting on the failure of a single distinct ingress link.) This message may be sent on the ring direction opposite the link break or on both ring directions. For robustness, it is desirable to send the message on both ring directions. In a network that does not wrap messages from one ring direction to the other ring direction, it is required that the message be sent on both ring directions to handle failure scenarios such as that in FIG. 4. The message may also be a broadcast or a unicast message to each node on the ring. For robustness and for capacity savings, it is desirable to use broadcast. In particular, broadcast ensures that knowledge of the link break will reach all nodes, even those that are new to the ring and whose presence may not be known to the node sending the message. In either case, the mechanism ensures that the propagation time required for the message to reach all nodes on the ring is upper bounded by the time required for a highest priority message to travel the entire circumference of the ring. It is desirable that each mechanism also ensure that messages passing through each node are processed in the fastest possible manner. This minimizes the time for the message to reach all nodes in the ring.

The link status message sent out by a node should contain at least the following information: source node address, link identification of the broken or degraded link for which the node is on the receive end, and link status for that link. For simplicity of implementation, the link status message can be expanded to contain link identification and status for all links for which the node is on the receive end. The link identification for each link, in general, should contain at least the node address of the node on the other end of the link from the source node and the corresponding physical interface identifier of the link's connection to the destination node. The mechanism by which the source node obtains this information is found in the co-pending application entitled "Dual-Mode Virtual Network Addressing," Ser. No. 09/518, 957, filed herewith by Jason Fan et al., assigned to the present assignee and incorporated herein by reference. The physical interface identifier is important, for example, in a two-node network where the address of the other node is not enough to resolve which link is actually broken or degraded. Link status should indicate the level of degradation of the link, typically expressed in terms of measured bit error rate on the link (or in the event that the link is broken, a special identifier such as 1).

The link status message may optionally contain two values of link status for each link in the event that protection switching is non-revertive. An example of non-revertive switching is illustrated by a link degrading due to, for example, temporary loss of optical power, then coming back up. The loss of optical power would cause other nodes in the network to protection switch. The return of optical power, however, would not cause the nodes to switch back to default routes in the case of non-revertive switching until explicitly commanded by an external management system. The two values of link status for each link, therefore, may consist of a status that reflects the latest measured status of the link (previously described) and a status that reflects the worst measured status (or highest link cost) of the link since the last time the value was cleared by an external management system.

The link status message can optionally be acknowledged by the other nodes. In the event that the message is not acknowledged, it must be sent out multiple times to ensure that it is received by all other nodes. In the event that the message requires acknowledgement on receipt, it must be acknowledged by all expected recipient nodes within some time threshold. If not, the source node may choose to re-send the link status message to all expected recipients, or re-send the link status message specifically to expected recipients that did not acknowledge receipt of the message.

Fast Source Node Re-routing Mechanism

This section describes a mechanism which allows a node in a ring network to rapidly re-route paths that cross broken links. The following describes a fast source node re-routing mechanism when node 0 is the source node.

For each destination node j, a cost is assigned to each output direction (0 and 1) from node 0 on the ring. A preferred direction for traffic from nodes 0 to j is selected based on the direction with the lowest cost. For simplicity, the mechanism for reassigning costs to the path to each destination node for each output direction from node 0 operates with a constant number of operations, irrespective of the current condition of the ring. (The mechanism may be further optimized to always use the minimum possible number of operations, but this will add complexity to the algorithm without significantly increasing overall protection switching speed.) The mechanism for reassigning an output direction to traffic packets destined for a given node based on the path cost minimizes the time required to complete this reassignment.

A table is maintained at each node with the columns Destination Node, direction 0 cost, and direction 1 cost. An example is shown as Table 1. The computation of the cost on a direction from node 0 (assuming node 0 as the source) to node j may take into account a variety of factors, including the number of hops from source to destination in that direction, the cumulative normalized bit error rate from source to destination in that direction, and the level of traffic congestion in that direction. Based on these costs, the preferred output direction for traffic from the source to any destination can be selected directly. The example given below assumes that the costs correspond only to the normalized bit error rate from source to destination in each direction. The cost on a given link is set to 1 if the measured bit error rate is lower than the operational bit error rate threshold. Conveniently, if all links are fully operational, the cumulative cost from node 0 to node j will be equal to the number of hops from node 0 to node j if there is no traffic congestion. Traffic congestion is not taken into account in this example.

For a representative ring with a total of 8 nodes (in clockwise order 0, 1, 2, 3, table's normal operational setting at node 0 is:

TABLE 1

Preferred direction table at node 0

| Destination Node | Direction 0 cost | Direction 1 cost | Preferred Direction |
|---|---|---|---|
| 1 | 1 | 7 | 0 |
| 2 | 2 | 6 | 0 |
| 3 | 3 | 5 | 0 |
| 4 | 4 | 4 | 0 |
| 5 | 5 | 3 | 1 |
| 6 | 6 | 2 | 1 |
| 7 | 7 | 1 | 1 |

The preferred direction is that with the lower cost to reach destination node j. In the event that the costs to reach node j on direction 0 and on direction 1 are equal, than either direction can be selected. (Direction 0 is selected in this example.) The normal operational cost for each physical route (source to destination) is computed from the link status table shown in Table 2.

The pseudocode for selection of the preferred direction is:

```
For j=1 to N-1 {N is the total number of nodes in the ring}
    Update direction 0 cost (dir_0_cost(j)) and direction 1 cost
(dir_1_cost(j)) for each destination node j; {expanded later in this
section}
    {HYST_FACT is the hysteresis factor to prevent a ping-pong
effect due to BER variations in revertive networks. A default value for
this used in SONET is 10}
    If(dir_0_cost(j) < dir_1_cost(j)/HYST_FACT),
        dir_preferred(j) = 0;
    Else if(dir_1_cost(j) < dir_0_cost(j)/HYST_FACT),
        dir_preferred(j) = 1;
    Else if dir_preferred(j) has a pre-defined value,
        {This indicates that dir_preferred(j) has been previously set to
        a preferred direction and thus should not change if the above two
        conditions were not met}
        dir_preferred(j) does not change;
    Else if dir_preferred(j) does not have a pre-defined value,
        if dir_0_cost(j) < dir_1_cost(j),
            dir_preferred(j) = 0;
        Else if dir_1_cost(j) < dir_0_cost(j),
            dir_preferred(j) = 1;
        Else
            dir_preferred(j) = 0;
    End {else if dir_preferred(j) does not have a pre-defined value}
End {for loop j}
```

The link status table (accessed by a CPU at each node) is used to compute the costs in the preferred direction table above. The link status table's normal operational setting looks like:

TABLE 2

Link status table (identical at every node)

| Link Identifier, direction 0 | Link Identifier, direction 1 | Direction 0 cost | Direction 1 cost |
|---|---|---|---|
| $d_{01}$ | $d_{10}$ | 1 | 1 |
| $d_{12}$ | $d_{21}$ | 1 | 1 |
| $d_{23}$ | $d_{32}$ | 1 | 1 |
| $d_{34}$ | $d_{43}$ | 1 | 1 |
| $d_{45}$ | $d_{54}$ | 1 | 1 |
| $d_{56}$ | $d_{65}$ | 1 | 1 |
| $d_{67}$ | $d_{76}$ | 1 | 1 |
| $d_{70}$ | $d_{07}$ | 1 | 1 |

The cost for each link $d_{ij}$ is the normalized bit error rate, where the measured bit error rate on each link is divided by the default operational bit error rate (normally 10E-9 or lower). In the event that the normalized bit error rate is less than 1 for a link, the value entered in the table for that link is 1.

The pseudocode for the line "Update direction 0 cost and direction 1 cost" for each node j in the pseudocode for selection of preferred direction uses the link status table shown in Table 2 as follows:

```
{Initialization of Linkcostsum values in each direction. These
variables are operated on inside the for loop below to generate
dir_0_cost(j) and dir_1_cost(j).}
    Linkcostsum_dir 0 = 0;
{Linkcostsum_dir 1 is the sum of link costs all the way around the
ring in direction 1, starting at node 0 and ending at node 0.}
    Linkcostsum_dir 1 = sum over all links(Linkcost_dir 1);
    For j=0 to N-1 {N is the total number of nodes in the ring}
        {MAX_COST is the largest allowable cost in the preferred
direction table. Linkcost_dir 0, link i,j is the cost of the link in direction 0
from node i to node j.}
        If(Linkcostsum_dir 0 < MAX_COST)
            Linkcostsum_dir 0 =
            Linkcostsum_dir 0+Linkcost_dir 0, link j, (j+1) modN;
        else
            Linkcostsum_dir 0 = MAX_COST;
        dir_0_cost(j) = Linkcostsum_dir 0;
        If(Linkcostsum_dir 1 < MAX_COST)
            Linkcostsum_dir 1 =
            Linkcostsum_dir 1-Linkcost_dir 1, link (j+1) modN, j;
        else
            Linkcostsum_dir 1 = MAX_COST;
        dir_1_cost(j) = Linkcostsum_dir 1;
    End {for loop j}
```

The update of the link status table is based on the following pseudocode:

```
{This version of the pseudocode assumes more than 2
   nodes in the ring}
If (linkstatusmessage.source=node i) and
    (linkstatusmessage.neighbor=node j) and (direction=0)
    Linkcost_dir 0,link i,j=linkstatusmessage.status;
else if (linkstatusmessage.source=node i) and
(linkstatusmessage.neighbor=node j) and (direction=1)
    Linkcost_dir 1,linkj, i=linkstatusmessage.status;
```

In the event that a link is broken, the linkstatusmessage.status for that link is a very large value. In the event that a link is degraded, the linkstatusmessage.status for that link is the measured bit error rate on that link divided by the undegraded bit error rate of that link. All undegraded links are assumed to have the same undegraded bit error rate.

The link status table may optionally contain two cost columns per direction to handle non-revertive switching scenarios. These would be measured cost (equivalent to the columns currently shown in Table 2) and non-revertive cost. The non-revertive cost column for each direction contains the highest value of link cost reported since the last time the value was cleared by an external management system. This cost column (instead of the measured cost) would be used for preferred direction computation in the non-revertive switching scenario. The preferred direction table may also optionally contain two cost columns per direction, just like the link status table. It may also contain two preferred direction columns, one based on the measured costs and the other based on the non-revertive costs. Again, the non-revertive cost columns would be used for computations in the non-revertive switching scenario.

As an example, assume that the clockwise link between node 2 and node 3 is degraded with factor a (where a>HYST_FACT), the clockwise link between node 4 and node 5 is broken (factor MAX), the counterclockwise link between node 1 and node 2 is degraded with factor b (where b>HYST_FACT), and the counterclockwise link between node 5 and node 6 is degraded with factor c (where c<a/HYST_FACT). The link status table for this example is shown in Table 3.

TABLE 3

Example of link status table with degraded and broken links

| Link Identifier, direction 0 | Link Identifier, direction 1 | Direction 0 cost (clockwise) | Direction 1 cost (counterclockwise) |
|---|---|---|---|
| $d_{01}$ | $d_{10}$ | 1 | 1 |
| $d_{12}$ | $d_{21}$ | 1 | b |
| $d_{23}$ | $d_{32}$ | a | 1 |
| $d_{34}$ | $d_{43}$ | 1 | 1 |
| $d_{45}$ | $d_{54}$ | MAX | 1 |
| $d_{56}$ | $d_{65}$ | 1 | c |
| $d_{67}$ | $d_{76}$ | 1 | 1 |
| $d_{70}$ | $d_{07}$ | 1 | 1 |

The costs of the links needed between the source node and destination node are added to determine the total cost.

The preferred direction table for the source node 0 is then:

TABLE 4

Example of preferred direction table with degraded and broken links

| Destination Node | Direction 0 cost (clockwise) | Direction 1 cost (counterclockwise) | Preferred Direction |
|---|---|---|---|
| 1 | 1 | c+b+5 | 0 |
| 2 | 2 | c+5 | 0 |
| 3 | a+2 | c+4 | 1 |
| 4 | a+3 | c+3 | 1 |
| 5 | MAX | c+2 | 1 |
| 6 | MAX | 2 | 1 |
| 7 | MAX | 1 | 1 |

(In the selection of the preferred direction, it is assumed that HYST_FACT=110.)

Once these preferred directions are determined, a corresponding mapping table of destination node to preferred direction in packet processors on the data path is modified to match the above table.

Neighbor Fault Notification in Optional Interim Wrapping Mechanism

This section describes a specific fast mechanism for communication of a fault notification from the node on one side of the faulty span to the node on the other side. This mechanism, as described previously, is only necessary in the event of a single link failure, since the node using that link as its egress link cannot detect that it is faulty.

A neighbor fault notification message is sent from each node detecting any link break or degradation on an ingress link to the node. The message is sent on each egress link that is part of the same span as the faulty ingress link. To ensure that it is received, the notification message can be acknowledged via a transmission on both directions around the ring. If it is not acknowledged, then the transmitting node must send the notification multiple times to ensure that it is received. The message is highest priority to ensure that the time required to receive the message at the destination is minimized.

The neighbor fault notification message sent out by a node should contain at least the following information: source node address, link identification of the broken or degraded link for which the node is on the receive end, and link status for that link. For simplicity of implementation, the neighbor fault notification message may be equivalent to the link status message broadcast to all nodes that has been previously described.

Description of Hardware

Figure 6:
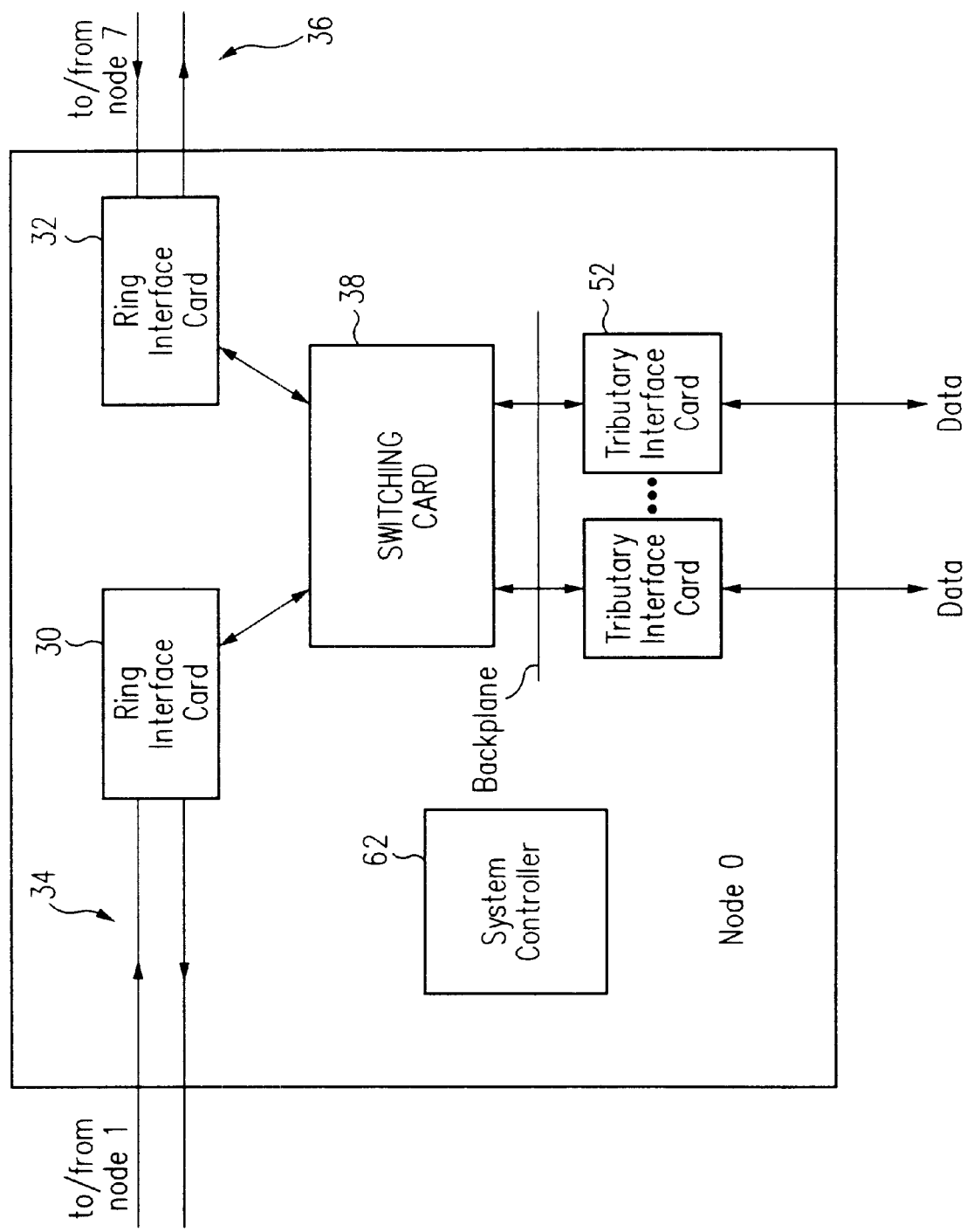
FIG. 6 illustrates pertinent hardware used in a single node.

FIG. 6 illustrates the pertinent functional blocks in each node. Node 0 is shown as an example. Each node is connected to adjacent nodes by ring interface cards 30 and 32. These ring interface cards convert the incoming optical signals on fiber optic cables 34 and 36 to electrical digital signals for application to switching card 38.

Figure 7:
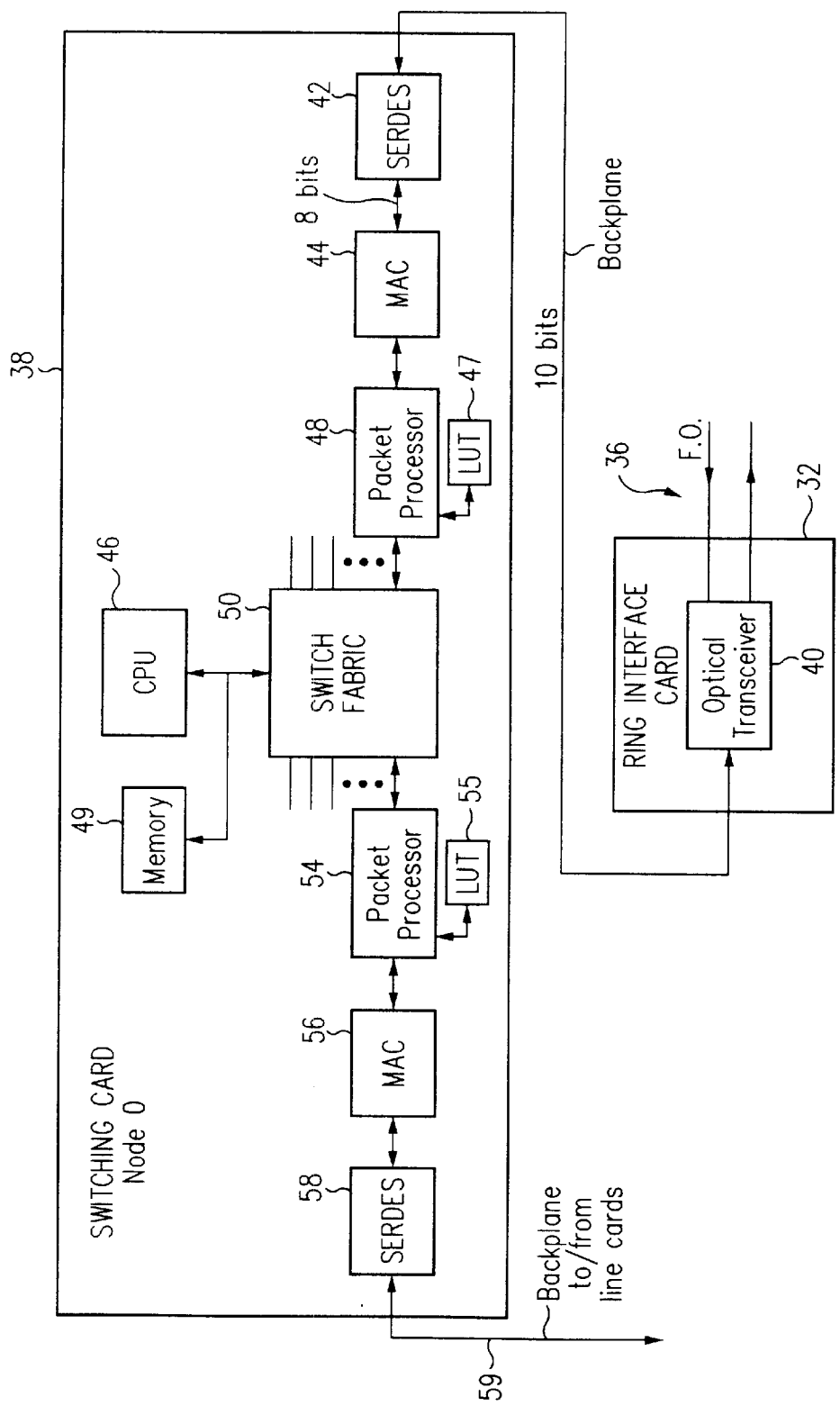
FIG. 7 provides additional detail of the switching card and ring interface card in FIG. 6.

FIG. 7 illustrates one ring interface card 32 in more detail showing the optical transceiver 40. An additional switch in card 32 may be used to switch between two switching cards for added reliability. The optical transceiver may be a Gigabit Ethernet optical transceiver using a 1300 nm laser, commercially available.

The serial output of optical transceiver 40 is converted into a parallel group of bits by a serializer/deserializer (SERDES) 42 (FIG. 6). The SERDES 42, in one example, converts a series of 10 bits from the optical transceiver 40 to a parallel group of 8 bits using a table. The 10 bit codes selected to correspond to 8 bit codes meet balancing criteria on the number of 1's and 0's per code and the maximum number of consecutive 1's and 0's for improved performance. For example, a large number of sequential logical 1's creates baseline wander, a shift in the long-term average voltage level used by the receiver as a threshold to differentiate between 1's and 0's. By utilizing a 10-bit word with a balanced number of 1's and O's on the backplane, the baseline wander is greatly reduced, thus enabling better AC coupling of the cards to the backplane.

When the SERDES 42 is receiving serial 10-bit data from the ring interface card 32, the SERDES 42 is able to detect whether there is an error in the 10-bit word if the word does not match one of the words in the table. The SERDES 42 then generates an error signal. The SERDES 42 uses the table to convert the 8-bit code from the switching card 38 into a serial stream of 10 bits for further processing by the ring interface card 32. The SERDES 42 may be a model VSC 7216 by Vitesse or any other suitable type.

A media access controller (MAC) 44 counts the number of errors detected by the SERDES 42, and these errors are transmitted to the CPU 46 during an interrupt or pursuant to polling mechanism. The CPU 46 may be a Motorola MPC860DT microprocessor. Later, it will be described what happens when the CPU 46 determines that the link has degraded sufficiently to take action to cause the nodes to re-route traffic to avoid the faulty link. The MAC 44 also removes any control words forwarded by the SERDES and provides OSI layer 2 (data-link) formatting for a particular protocol by structuring a MAC frame. MACs are well known and are described in the book "Telecommunication System Engineering" by Roger Freeman, third edition, John Wiley & Sons, Inc., 1996, incorporated herein by reference in its entirety. The MAC 44 may be a field programmable gate array.

The packet processor 48 associates each of the bits transmitted by the MAC 44 with a packet field, such as the header field or the data field. The packet processor 48 then detects the header field of the packet structured by the MAC 44 and may modify information in the header for packets not destined for the node. Examples of suitable packet processors 48 include the XPIF-300 Gigabit Bitstream Processor or the EPIF 4-L3C1 Ethernet Port L3 Processor by MMC Networks, whose data sheets are incorporated herein by reference.

The packet processor 48 interfaces with an external search machine/memory 47 (a look-up table) that contains routing information to route the data to its intended destination. The updating of the routing table in memory 47 will be discussed in detail later.

A memory 49 in FIG. 6 represents all other memories in the node, although it should be understood that there may be distributed SSRAM, SDRAM, flash memory, and EEPROM to provide the necessary speed and functional requirements of the system The packet processor 48 provides the packet to a port of the switch fabric 50, which then routes the packet to the appropriate port of the switch fabric 50 based on the packet header. If the destination address in the packet header corresponds to the address of node 0 (the node shown in FIG. 6), the switch fabric 50 then routes the packet to the appropriate port of the switch fabric 50 for receipt by the designated node 0 tributary interface card 52 (FIG. 6) (to be discussed in detail later). If the packet header indicates an address other than to node 0, the switch fabric 50 routes the packet through the appropriate ring interface card 30 or 32 (FIG. 56). Control packets are routed to CPU 46. Such switching fabrics and the routing techniques used to determine the path that packets need to take through switch fabrics are well known and need not be described in detail.

One suitable packet switch is the MMC Networks model nP5400 Packet Switch Module, whose data sheet is incorporated herein by reference. In one embodiment, four such switches are connected in each switching card for faster throughput. The switches provide packet buffering, multicast and broadcast capability, four classes of service priority, and scheduling based on strict priority or weighted fair queuing.

A packet processor 54 associated with one or more tributary interface cards, for example, tributary interface card 52, receives a packet from switch fabric 50 destined for equipment (e.g., a LAN) associated with tributary interface card 52. Packet processor 54 is bidirectional, as is packet processor 48. Packet processors 54 and 48 may be the same model processors. Generally, packet processor 54 detects the direction of the data through packet processor 54 as well as accesses a routing table memory 55 for determining some of the desired header fields and the optimal routing path for packets heading onto the ring, and the desired path through the switch for packets heading onto or off of the ring. This is discussed in more detail later. When the packet processor 54 receives a packet from switch fabric 50, it forwards the packet to a media access control (MAC) unit 56, which performs a function similar to that of MAC 44, which then forwards the packet to the SERDES 58 for serializing the data. SERDES 58 is similar to SERDES 42.

The output of the SERDES 58 is then applied to a particular tributary interface card, such as tributary interface card 52 in FIG. 56, connected to a backplane 59. The tributary interface card may queue the data and route the data to a particular output port of the tributary interface card 52. Such routing and queuing by the tributary interface cards may be conventional and need not be described in detail. The outputs of the tributary interface cards may be connected electrically, such as via copper cable, to any type of equipment, such as a telephone switch, a router, a LAN, or other equipment. The tributary interface cards may also convert electrical signals to optical signals by the use of optical transceivers, in the event that the external interface is optical.

The system controller 62 obtains status information from the node and interfaces with a network management system. This aspect of the node is not relevant to the invention. The system controller can be programmed to report on various tests of the network.

In one embodiment, the above-described hardware processes bits at a rate greater than 1 Gbps.

Functions of Hardware During Span Failure/Degradation

Figure 8:
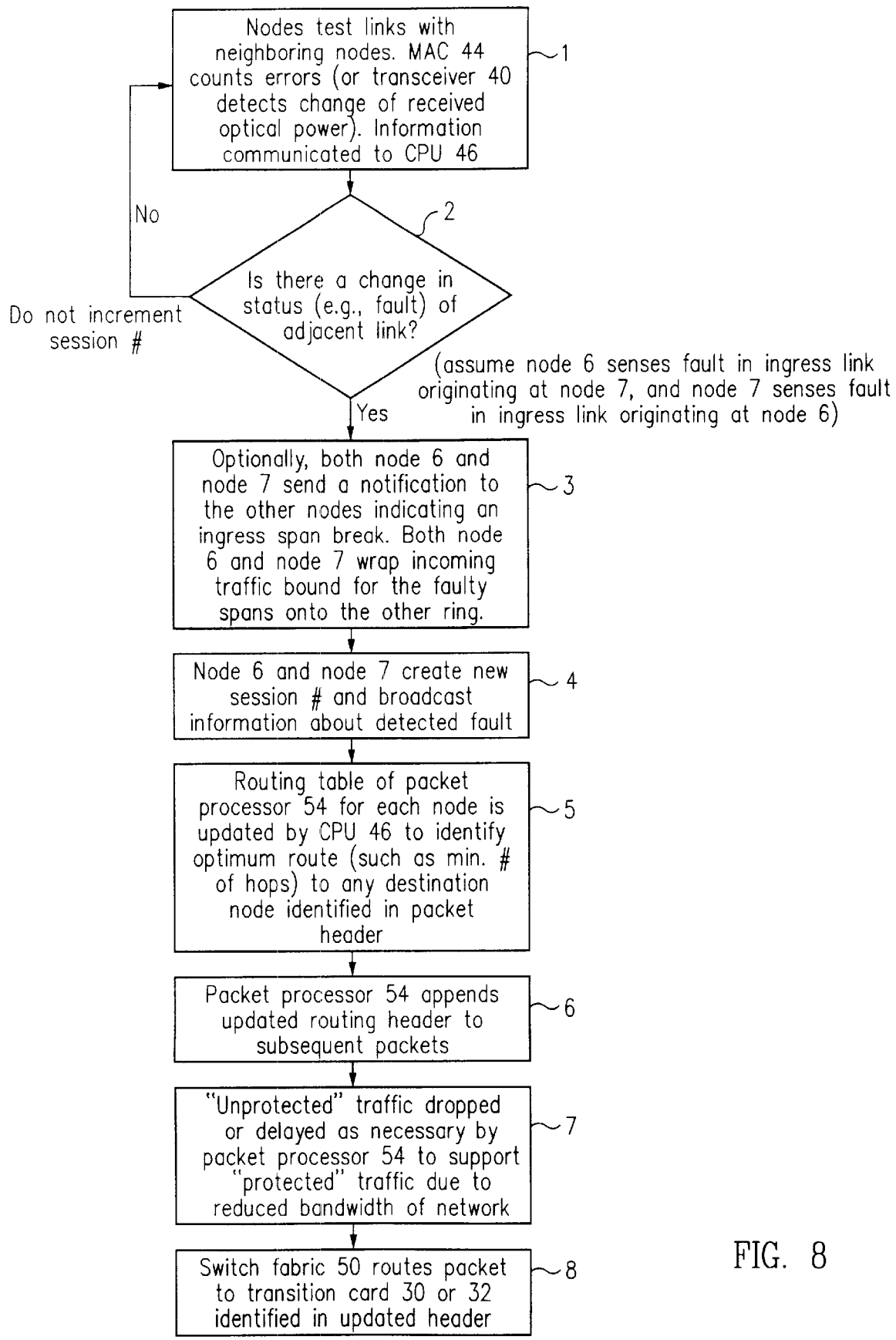
FIG. 8 is a flowchart illustrating steps used to identify a change in the status of the network and to re-route traffic through the network.

FIG. 8 is a flow chart summarizing the actions performed by the network hardware during a span failure or degradation. Since conventional routing techniques and hardware are well known, this discussion will focus on the novel characteristics of the preferred embodiment.

In step 1 of FIG. 8, each of the nodes constantly or periodically tests its links with neighboring nodes. The MAC 44 in FIG. 7 counts errors in the data stream (as previously described) and communicates these errors to the CPU 46. The CPU compares the bit error rate to a predetermined threshold to determine whether the link is satisfactory. An optical link failure may also be communicated to the CPU. CPU 46 may monitor ingress links from adjacent devices based on error counting by MAC 44 or based on the detection of a loss of optical power on ingress fiber 36. This detection is performed by a variety of commercially available optical transceivers such as the Lucent NetLight transceiver family. The loss of optical power condition can be reported to CPU 46 via direct signaling over the backplane (such as via 12C lines), leading to an interrupt or low-level event at the CPU.

In step 2, the CPU 46 determines if there is a change in status of an adjacent link. This change in status may be a fault (bit error rate exceeding threshold) or that a previously faulty link has been repaired. It will be assumed for this example that node 6 sensed a fault in ingress link connecting it to node 7.

If there is no detection of a fault in step 2, no change is made to the network. It is assumed in FIG. 8 that adjacent nodes 6 and 7 both detect faults on ingress links connecting node 6 to node 7. The detection of a fault leads to an interrupt or low-level event (generated by MAC 44) sent through switch fabric 50 to CPU 46 signaling the change in status.

In optional step 3, nodes 6 and 7 attempt to notify each other directly of the ingress link fault detected by each. The notification sent by node 6, for example, is sent on the egress link of node 6 connected to node 7. If the entire span is broken, these notifications clearly do not reach the destination. They are useful only if a single link within a span is broken. This is because a node has no way to detect a fiber break impacting an egress link. Based on this notification, each node can then directly wrap traffic in the fashion shown in FIG. 5. The wrapping of traffic in node 6 is performed through a configuration command from CPU 46 to packet processor 48 connected as shown in FIG. 7 to ring interface card 32 (assuming that links from ring interface card 32 connect to node 7). After receiving this command, packet processor 48 loops back traffic through the switching fabric and back out ring interface card 30 that it normally would send directly to node 7.

Each communication by a node of link status is associated with a session number. A new session number is generated by a node only when it senses a change in the status of a neighboring node. As long as the nodes receive packets with the current session number, then the nodes know that there is no change in the network. Both nodes 6 and 7 increment the session number stored at each node upon detection of a fault at each node.

In step 4, both node 6 and node 7 then broadcast a link status message, including the new session number, conveying the location of the fault to all the nodes. Each node, detecting the new session number, forwards the broadcast to its adjacent node.

A further description of the use of the session number in general topology reconfiguration scenarios, of which a link or span failure is one, is found in the co-pending application Ser. No. 019/519,957 entitled "Dual-Mode Virtual Network Addressing," by Jason Fan et al., assigned to the present assignee and incorporated herein by reference.

In step 5, the identity of the fault is then used by the packet processor 54 in each node to update the routing table in memory 55. Routing tables in general are well known and associate a destination address in a header with a particular physical node to which to route the data associated with the header. Each routing table is then configured to minimize the cost from a source node to a destination node. Typically, if the previously optimized path to a destination node would have had to go through the faulty link, that route is then updated to be transmitted through the reverse direction through the ring to avoid the faulty route. The routing table for each of the packet processors 54 in each node would be changed as necessary depending upon the position of the node relative to the faulty link. Details of the routing tables have been previously described.

In one embodiment, each of the nodes must acknowledge the broadcast with the new session number, and the originating node keeps track of the acknowledgments. After a time limit has been exceeded without receiving all of the acknowledgments, the location of the fault is re-broadcast without incrementing the sequence number.

Accordingly, all nodes store the current topology of the ring, and all nodes may independently create the optimum routing table entries for the current configuration of the ring.

In step 6, the routing table for each node has been updated and data traffic resumes. Accordingly, data originating from a LAN connected to a tributary interface card 52 (FIG. 56) has appended to it an updated routing header by packet processor 54 for routing the data through switch fabric 50 to the appropriate output port for enabling the data to arrive at its intended destination. The destination may be the same node that originated the data and, thus, the switch fabric 50 would wrap the data back through a tributary interface card in the same node. Any routing techniques may be used since the invention is generally applicable to any protocol and routing techniques.

Since some traffic around the ring must be re-routed in order to avoid the faulty link, and the bandwidths of the links are fixed, the traffic to be transmitted around the healthy links may exceed the bandwidth of the healthy links. Accordingly, some lower priority traffic may need to be dropped or delayed, as identified in step 7. Generally, the traffic classified as "unprotected" is dropped or delayed as necessary to support the "protected" traffic due to the reduced bandwidth.

In one embodiment, the packet processor 54 detects the header that identifies the data as unprotected and drops the packet, as required, prior to the packet being applied to the switch fabric 50. Voice traffic is generally protected.

In step 8, switch fabric 50 routes any packet forwarded by packet processor 54 to the appropriate output port for transmission either back into the node or to an adjacent node.

The above description of the hardware used to implement one embodiment of the invention is sufficient for one of ordinary skill in the art to fabricate the invention since the general hardware for packet switching and routing is very well known. One skilled in the art could easily program the MACs, packet processors, CPU 46, and other functional units to carry out the steps describe herein. Firmware or software may be used to implement the steps described herein.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a communication network, said network comprising nodes, interconnected by communication links, at least some of aid nodes being connected in a ring by said links, said method comprising:

automatically testing the, quality of links between nodes;

detecting by a first node that one or more first link do not meet quality threshold;

transmitting information from aid first node to other nodes to identify said one or more first links, wherein a status of a link is assigned a quality value, said step of transmitting comprising:

changing said quality value by said first node to indicate a change in status of said link due to said detecting by said first node that said link does not meet said quality threshold; and transmitting said information to identify said link as well as a changed quality value;

revising a routing table in at least some of said nodes to reroute traffic, if appropriate, such that the rerouted traffic does not transverse said one or more first links, due to said one or more first links being faulty; and routing traffic by source node to a destination node, based on a revised routing table at said source node, so as to route said traffic in a direction around ring different from a direction that the traffic would have traveled to said destination node had said one or more first links not been faulty.

2. The method of claim 1, further comprising:

receiving by nodes in said network a transmitted signal from said first node, said transmitted signal including said changed quality value; and, in response, revising a routing table, as appropriate, in at least some of said nodes to reroute traffic to take into account said one or more first links being faulty.

3. The method of claim 2 further comprising said nodes not revising a routing table if said quality value is the same as a previous quality value.

4. A method performed by a communication network, said network comprising nodes interconnected by communication links, at least some of said nodes being connected in a ring by said links, said method comprising:

automatically testing the quality of links between nodes;

detecting by a first node that one or more first links do not meet a quality threshold, transmitting information from said first node to other node to identify said one or more first links, revising a routing table in at least some of said node to reroute traffic, if appropriate, such that the rerouted traffic does not traverse said one or more first links, due to said one or more first links being faulty;

routing traffic by a source node to a destination node, based on a revised routing table at said source node, so as to route said traffic in a direction around said ring different from a direction that the traffic would have traveled to said destination node had said one or more first links not been faulty;

designating a first class of traffic to have a higher priority than a second class of traffic; and reducing capacity allocated to said second class of traffic, as necessary, due to a reduction of bandwidth of said network due to said revising of said routing table.

5. A method performed by a communications network, said network comprising nodes interconnected by communication links, at least some of said nodes being connected in a ring by said links said method comprising:

automatically testing the quality of links between nodes;

detecting by a first node that one or more first links do not meet a quality threshold; transmitting information from aid first node to other nodes to identify said one or more first links;

revising a routing table in at least some of said nodes to reroute traffic, if appropriate such that the rerouted traffic does not transverse said one or more first links, due to said one or more first links being faulty;

routing traffic by a source node in a destination node, based on a revised routing table at said source node, so as to route said traffic in a direction around said ring different from a direction that the traffic would have traveled to said destination node had said one or more first links not been faulty; and removing traffic from said network designated to be received by a destination node upon receipt of said traffic by said destination node.

6. A method performed by a communication network, said network comprising nodes interconnected by communication links, at least some of said nodes being connected in a ring by said links, said method comprising:

automatically testing the quality of links between nodes;

detecting by a first node that one or more first links do not meet a quality threshold; transmitting information from said first node to other node, to identify said one or more first links;

revising a routing table in at least some of said nodes to reroute traffic, if appropriate such that the rerouted traffic does not traverse said one or more first links, due to said one or more first links being faulty wherein, said revising of said routing table comprises:

determining which routes between nodes are impacted by said one or more links being faulty, and revising said routing tables to force all impacted traffic to be routed in an opposite direction around said ring, wherein said revising said routing tables comprises using pre-calculated lookup tables.

7. A communication network, said network comprising routing switches interconnected in a ring by communication links, said routing switch comprising:

one or more transceivers connected to associated links to one or more other routing switches;

a switch fabric for routing information to and from said one or more transceivers; a routing table; and one or more processors, wherein said one or more processors includes a serializer/deserializer, said one or more processors for controlling said routing switch to:

test the quality of links between routing switches;

detect that one or more first links, when connected to said routing switch, do not meet a quality threshold;

transmit information from said routing switch to other routing switches to identify said one or more first links;

revise said routing table to reroute traffic, if appropriate, such that the rerouted traffic does not traverse said one or more first links, due to said one or more first links being faulty; and route traffic to a destination node, based on a revised routing table, so as to route said traffic in a direction ground said ring different from a direction that the traffic would hive traveled to said destination node had said one or more first links not been faulty.

8. A communications network, said network comprising routing switches interconnected in a ring by communication links, said routing switch comprising:

one or more transceivers connected to associated links, to one, or more other routing switches;

a switch fabric for routing information to and from said one or more transceivers; a routing table; and one or more processors, wherein said one or more processors includes a media access controller, said one or more processors for controlling said routing switch to:

test the quality of links between routing switches;

detect that one or more first links, when connected to said routing switch, do not meet a quality threshold;

transmit information from said routing switch to other routing switches to identify said one or more first links;

revise said routing table to reroute traffic, if appropriate, such that the rerouted traffic does not traverse said one or more first links, due to said one or more first links being faulty; and route traffic to a destination node, based on a revised routing table, so as to route said traffic in a direction around said ring different from a direction that the traffic would have traveled to said destination node had said one or more first links not been faulty.

9. A communications network, said network comprising routing switches interconnected in a ring by communication links, said routing switch comprising:

one or more transceivers connected to links to one or more other routing switches;

a switch fabric for routing information to and from said one or more transceivers; a routing table; and one or more processors, said one or more processors for controlling said routing switch to:

test the quality of links between routing switches;

detect that one or more first links, when connected to said routing switch, do not meet a quality threshold;

transmit information from said routing switch to other routing switches to identify said one or more first links;

revise said routing table to reroute traffic, if appropriate, such that the rerouted traffic does not traverse said one or more first links, due to said one or more first links being faulty;

route traffic to a destination node, based on a revised routine table so as to route said traffic in a direction around said ring different from a direction that the traffic would have traveled to said destination node had said one or more first links not been faulty, wherein said one or more processors are also for controlling said routing switch to assign a quality value to a status of a link, said one or more processors controlling said routing switch to;

change said quality value to indicate a change in status of said link due to detecting by said routing switch that said link does not meet said quality threshold; and transmit said information to identify said link as well as a changed quality value.

10. The network of claim 9 wherein said one or more processors are also for controlling said routing switch to:

revise said routing table, as appropriate, if said routing switch receives a transmitted signal from another routing switch including said changed quality value, so as to reroute traffic to take into account one or more faulty links.

11. The network of claim 10 wherein said one or more processors are also for controlling said routing switch to not revise said routing table if said quality value is the same as a previous quality value.

* * * * *